United States Patent [19]

Hehl

[11] Patent Number: 4,669,533

[45] Date of Patent: Jun. 2, 1987

[54] COOLING AND FILTERING UNIT FOR HYDRAULIC DRIVE FLUID

[76] Inventor: Karl Hehl, Arthur-Hehl-Strasse 32, 7298 Lossburg 1, Fed. Rep. of Germany

[21] Appl. No.: 697,154

[22] Filed: Feb. 1, 1985

[30] Foreign Application Priority Data

Feb. 1, 1984 [DE] Fed. Rep. of Germany ....... 3403429

[51] Int. Cl.[4] .................... F28D 7/02; F28F 19/00; F28F 9/22; F28F 1/42
[52] U.S. Cl. .................... 165/47; 165/119; 165/160; 165/163; 165/179; 165/184
[58] Field of Search ............ 165/47, 51, 119, 156, 165/160, 163, 179, 184

[56] References Cited

U.S. PATENT DOCUMENTS

| | | | |
|---|---|---|---|
| 1,856,771 | 5/1932 | Loeffler | 165/119 |
| 2,529,545 | 11/1950 | Edwards | 165/184 |
| 2,696,368 | 12/1954 | Edwards | 165/184 |
| 3,526,273 | 9/1970 | Wentworth, Jr. | 165/160 |
| 3,802,499 | 4/1974 | Garcea | 165/160 |
| 4,138,288 | 2/1979 | Lewin | 165/163 |
| 4,232,735 | 11/1980 | Kim et al. | 165/184 |
| 4,317,268 | 3/1982 | Bowden et al. | 165/163 |
| 4,349,950 | 9/1982 | Bowden | 165/163 |
| 4,559,999 | 12/1985 | Servas et al. | 165/156 |

FOREIGN PATENT DOCUMENTS

| | | | |
|---|---|---|---|
| 2361515 | 6/1975 | Fed. Rep. of Germany | 165/119 |
| 7615571 | 10/1976 | Fed. Rep. of Germany | . |
| 2736615 | 2/1979 | Fed. Rep. of Germany | 165/163 |
| 2834399 | 10/1979 | Fed. Rep. of Germany | . |
| 3146460 | 6/1983 | Fed. Rep. of Germany | 165/156 |
| 2421274 | 11/1979 | France | 165/51 |
| 936249 | 9/1963 | United Kingdom | 165/156 |
| 1314820 | 4/1973 | United Kingdom | 165/160 |
| 1362538 | 8/1974 | United Kingdom | 165/163 |

OTHER PUBLICATIONS

Rippenrohre fur Warmeubertrager, R. & G. Schmole GmbH, published Jan. 1982.

Primary Examiner—William R. Cline
Assistant Examiner—John K. Ford
Attorney, Agent, or Firm—Joseph A. Geiger

[57] ABSTRACT

A self-contained, wall-mountable cooling and filtering unit for hydraulic drive fluid featuring a coiled heat transfer pipe in a coil chamber which surrounds a drum-type filter cartridge, the hot fluid flowing through the coil chamber in the axial direction, before traversing the filter cartridge in a radial inward direction and exiting from the device. The heat transfer pipe is a finned pipe with an integral helical fin having is originally radial fin wall bent away at four folding lines in a rectangle, to form aligned fold segments in four longitudinal surface planes. The fold segments support superposed pipe turns in the heat transfer coil while positioning the latter against the walls of the coil chamber.

17 Claims, 5 Drawing Figures

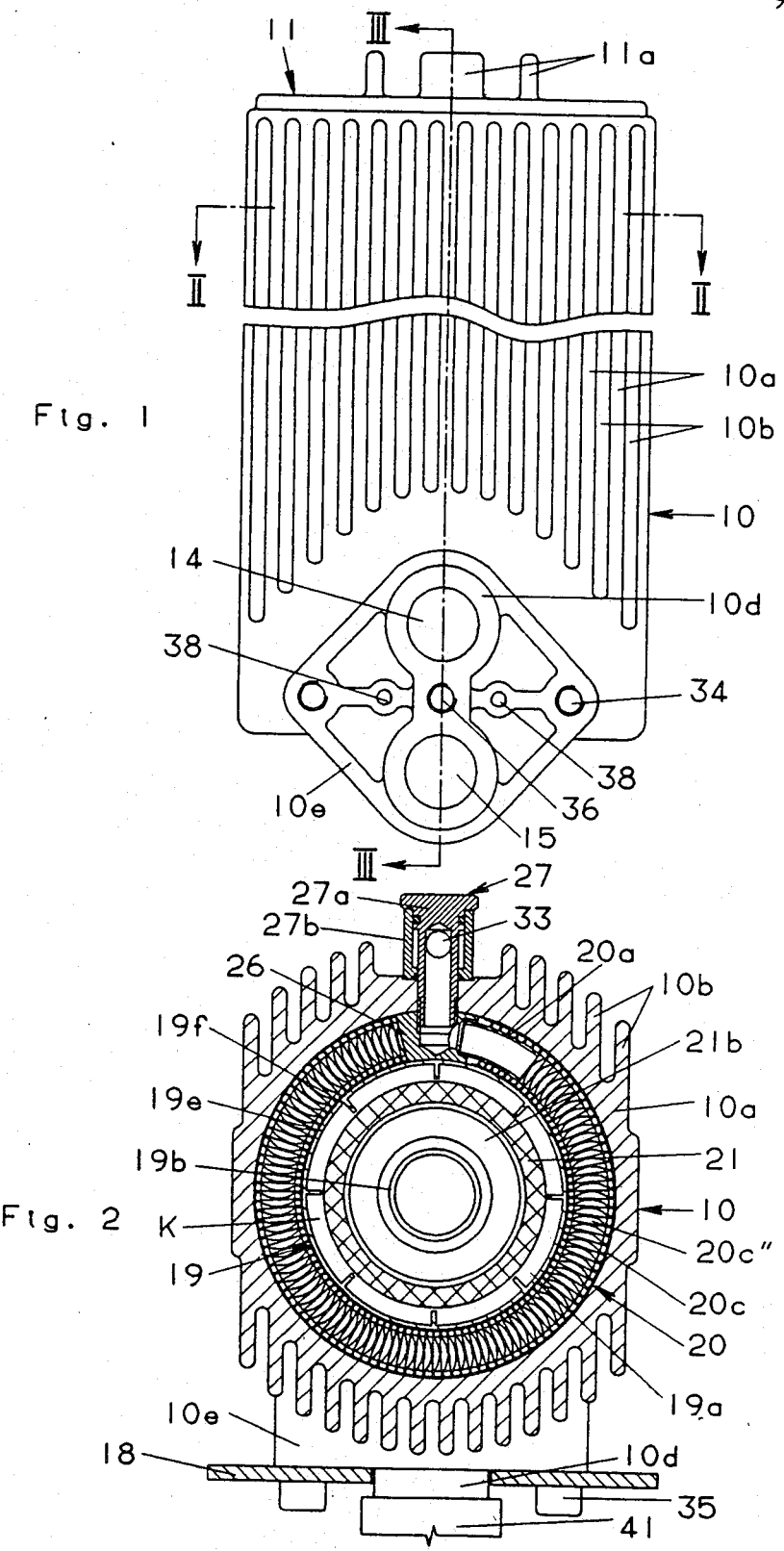

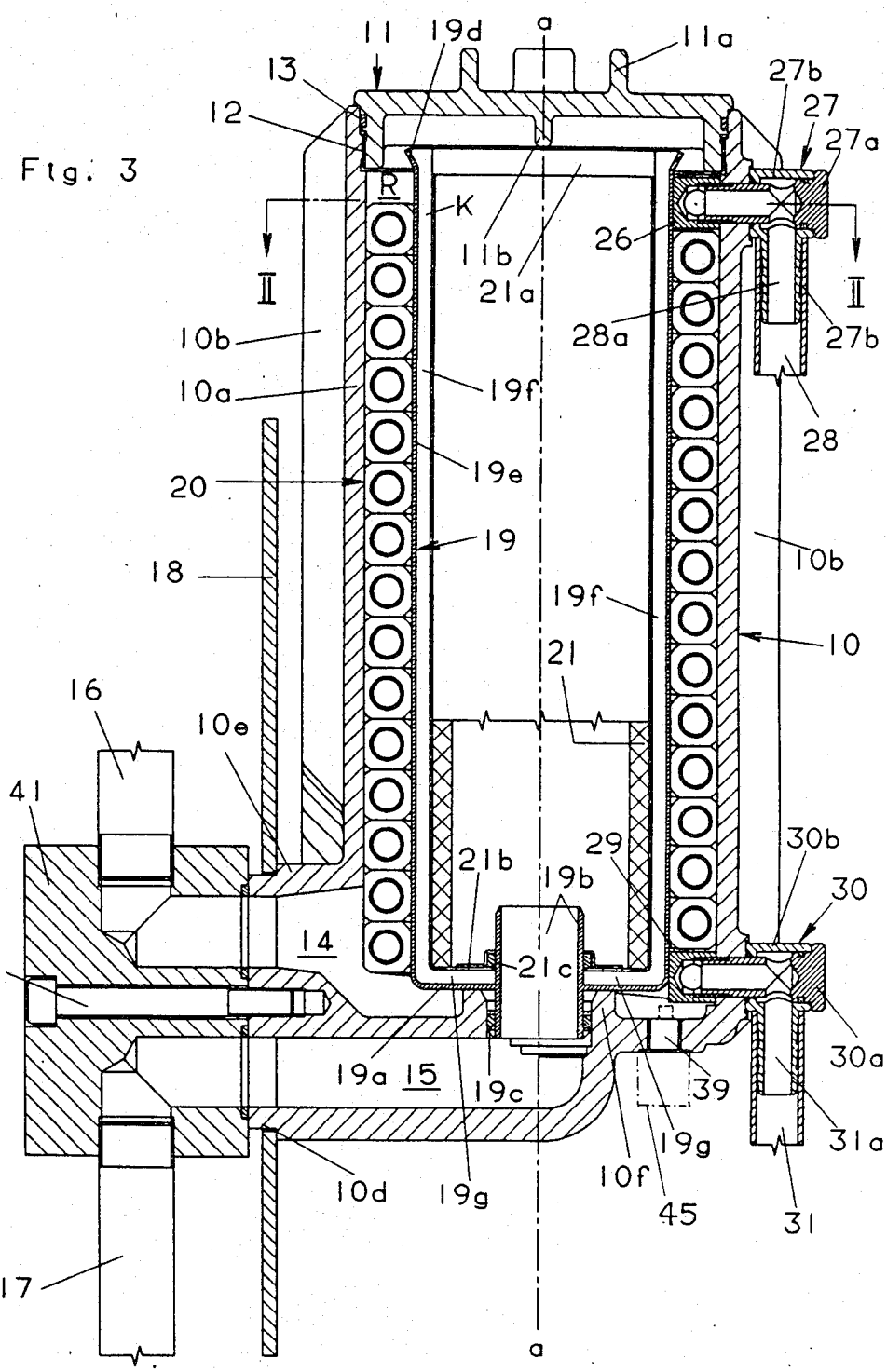

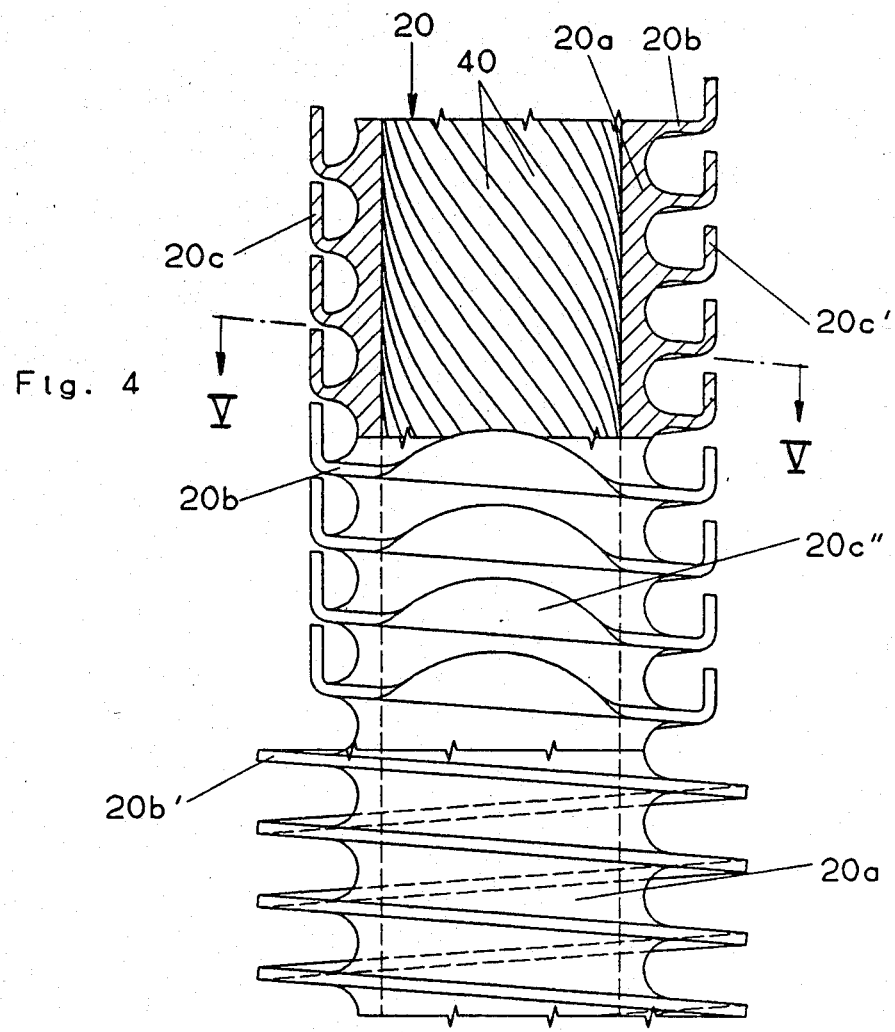
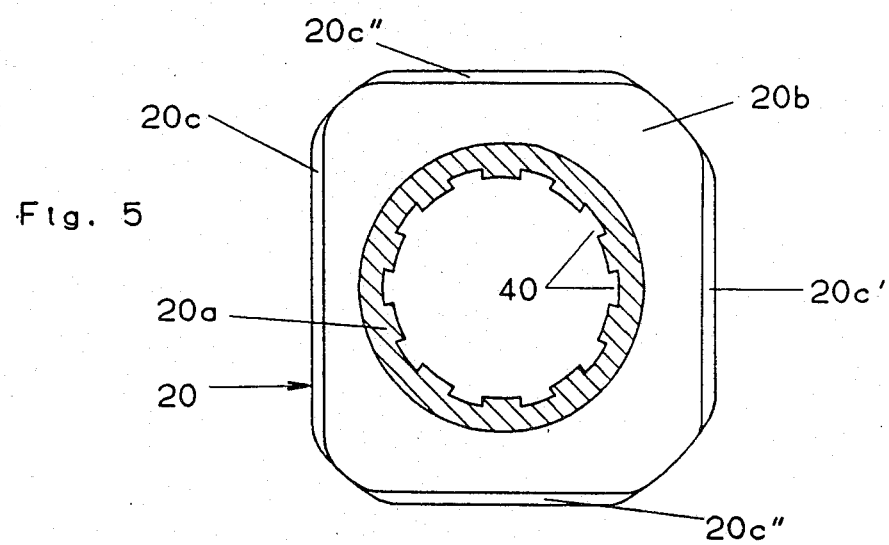

COOLING AND FILTERING UNIT FOR HYDRAULIC DRIVE FLUID

BACKGROUND OF THE INVENTION

1. Field of the Invention

The present invention relates to cooling and filtering devices for hot working fluids and, more particularly, to a counter-flow-type liquid -to-liquid heat transfer device adapted for the cooling and filtering of the hydraulic fluid which serves as the pressure medium in a hydraulic drive system.

2. Description of the Prior Art

Several devices which provide both a cooling and a filtering function for hot working fluids are known from the prior art. One such device, disclosed in the German Patent No. 28 34 399, is adapted for the cooling and filtering of the lubricating oil of internal combustion engines. In this device, the hot fluid first traverses a filter cartridge in a radial inward direction, whereupon it enters a heat transfer section of the housing which extends transversely away from the filter section.

Inside the heat transfer section, the hot filtered fluid flows around a central hollow heat transfer cylinder with a series of annular ribs on its circumference which transfer heat from the fluid to a cooling medium flowing on the inside of the heat transfer cylinder. Because of its angular outline, this device requires a considerable amount of space and its cooling unit is comparatively ineffective, having only a few annular ribs on a single short heat transfer element.

Another fluid cooling and filtering device is disclosed in the German Gebrauchsmuster (Utility Model) No. 76 15 571. This device, adapted for mounting inside the fluid reservoir of a machine, suspended from a cover on its top wall, has an upper filtering section and an axially aligned lower cooling section. The used hot fluid enters the device at its upper end, passing radially through a filter cartridge and from there downwardly into an annular coil chamber which is occupied by the double coil of a finned heat transfer pipe. The device may be arranged for either a vertically upward or a vertically downward flow of the filtered fluid in the coil chamber.

This known device has the shortcoming of requiring a considerable amount of space, while being limited in its mounting possibilities to the top wall of a fluid reservoir. The device has a comparatively complex structure, presenting access problems for cleaning and inspection purposes. The double-helix heat transfer coil requires a radially large coil chamber, where major portions of the flow space are not occupied by pipe fins and therefore can be bypassed by the fluid.

The use of helical fins on heat transfer pipe is likewise known from the prior art: See, for example, pages 10 and 13 of "Rippenrohre"—Catalog 830.03/January 1982 of R. & G. Schmöle Metallwerke GmbH & Co. KG, 5750 Menden, Federal Republic of Germany. This catalog shows that the helical fin may be attached to the outer circumference of a pipe wall by soldering, by frictional engagement with an L-shaped inner edge of the fin, or by swaging attachment to a helical groove in the pipe.

Alternatively, the helical fin may be an integral part of the wall of the heat transfer pipe itself, being produced in a rolling and shaping operation in which the pipe wall is extruded radially outwardly between cooperating shaping tools, in a rolling operation which is similar to a thread rolling operation.

A disadvantage of the integral helical fin, apart from its restriction to pipe stock of highly malleable metal, such as copper and some of its alloys, resides in the fact that the rolling operation produces a fin which may have an uneven outer diameter and, consequently, may exhibit noticeable deviations from a true helix. A heat transfer coil employing this kind of pipe, therefore, requires a greater axial distance between coil turns and a coil chamber which is wide enough to accommodate the maximum fin diameter, with the result that space is wasted inside the coil chamber and it is easier for the fluid to bypass the fins of the heat transfer pipe.

SUMMARY OF THE INVENTION

Underlying the present invention is the primary objective of suggesting an improved cooling and filtering device for working fluids, especially hydraulic drive fluid, which is self-contained and compact in structure and offers easy access for inspection and servicing. This compactness is to be achieved, at least in part, by a more compact heat transfer coil arranged in a narrower coil chamber which operates at a higher liquid-to-liquid heat transfer efficiency.

The present invention proposes to attain this objective by suggesting a cooling and filtering device for hydraulic drive fluid which has an annular coil chamber for a helical heat transfer coil formed by a length of finned heat transfer pipe, portions of the helical fin of the heat transfer pipe being bent at a right angle along two parallel bending lines which are located on diametrically opposite sides of the pipe.

The parallel bending lines of the fold segments are so oriented that, in the heat transfer coil, they extend substantially parallel to the center axis of the coil, with the result that the numerous fold segments on the heat transfer pipe form quasi-cylindrical support surfaces on the radially inner and outer sides of the heat transfer coil and at least the outer one of these support surfaces is in heat transfer contact with the outer wall of the coil chamber.

The folds segments on the heat transfer pipe make it possible to arrange a heat transfer coil with a given total fin surface inside a considerably narrower coil chamber, thereby improving the heat transfer action between the hot fluid on the outside of the pipe and the cooling medium on the inside of the pipe.

In a preferred embodiment of the invention, the heat transfer pipe has its helical fin bent along two additional bending lines which are oriented substantially radially in relation to the center axis of the heat transfer coil, the resulting fold segments defining parallel support surfaces on the upper and lower sides of the heat transfer pipe, so that adjacent turns of the heat transfer coil can contact and support each other on these surfaces.

The supporting fold segments on the upper and lower sides of the heat transfer pipe make it possible to wind a given length of pipe into a heat transfer coil of reduced height. This feature, by further reducing the flow space between the pipe turns, also contributes to the improvement of the heat transfer efficiency.

The higher heat transfer efficiency signifies that it is possible to achieve the same level of cooling action with a shorter length of pipe, thus lowering the cost of the device. At the same time, the cooling water leaves the device with a higher temperature. This, in turn, means that less cooling water is needed and the operating costs are correspondingly reduced.

The higher degree of heat transfer efficiency in the heat transfer coil is the result of a more intense contact between the fluid which is to be cooled and the fin surfaces of the heat transfer pipe. The narrowing of the flow spaces between these surfaces requires a correspondingly higher flow speed of the fluid and a higher fluid pressure, with the result that more turbulence is created. Further increasing the turbulence are the upper and lower fold segments of the heat transfer pipe.

The present invention further suggests the arrangement of the filtering section of the device concentrically inside and downstream of the cooling section, the filtering section being so arranged that it is possible to operate the device with or without a filter cartridge in place.

Whereas the prior art suggests that the used working fluid should be filtered while it is still hot, in order to take advantage of its reduced viscosity, the present invention represents a departure from this approach, preferring to use a filter cartridge of larger surface—which readily fits into the space surrounded by the coil chamber—while offering an effective protection for the web of the filter cartridge against the action of pressures waves in the fluid which result from the switching action of hydraulic valves. These pressure waves are instead absorbed by the heat transfer coil.

The heat transfer coil is preferably preloaded radially outwardly against the outer wall of the coil chamber, for a better heat transfer contact between the quasi-cylindrical outer surface of the heat transfer coil and the housing of the device. More heat can thus be transferred directly to the ambient atmosphere.

By using the bore of the housing as the outer wall of the coil chamber and by arranging the connector assemblies for the cooling medium with connector heads on the outside of the wall and hollow connector screws which reach radially through the housing wall into pipe terminals which are soldered to the ends of the heat transfer pipe, the invention achieves a configuration of the device which greatly facilitates the installation and removal of both the filter cartridge and the heat transfer coil.

By further suggesting to use for the inner wall of the coil chamber the outer wall of a removable plastic shell which surrounds the filter cartridge with longitudinal spacer ribs and supports it with radial ribs on a closed end wall, the invention not only provides an insulating member which minimizes the reheating of the cooled fluid through heat leakage across the inner coil chamber wall, it also makes it possible to remove the plastic shell and the filter cartridge as an assembly, so as not to disturb the filter sludge which may have collected between them.

The device of the invention also makes it possible to install a pressure monitoring means in a seating bore of the housing, the pressure monitoring means responding to the pressure in the coil chamber as an indication of the sludge accumulation on the filter cartridge which causes a corresponding increase in the flow resistance across the filter cartridge.

The self-contained compact structure of the cooling and filtering device of the invention makes it possible to conveniently mount the device on any suitable vertical wall of a production machine, independently of the location of the fluid reservoir, for example. A removable connecting block on the opposite side of the wall carries the connections for ends of two fluid lines.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows:

FIG. 1 shows, in an elevational view, a cooling and filtering unit embodying the present invention;

FIG. 2 shows the cooling and filtering unit of FIG. 1 in a plan view and sectioned along line II—II of FIG. 1;

FIG. 3 shows the cooling and filtering unit of FIGS. 1 and 2 in an elevational side orientation and sectioned along line III—III of FIG. 1, as attached to a supporting wall and carrying inlet and outlet connections;

FIG. 4 shows an enlarged, partially sectioned detail of the finned heat transfer pipe with separate length portions carrying folded and unfolded fins, respectively; and FIG. 5 shows the heat transfer pipe of FIG. 4 in a transverse cross section.

DESCRIPTION OF THE PREFERRED EMBODIMENT

Referring to FIGS. 2 and 3 of the drawing, it can be seen that the fluid cooling and filtering unit of the invention consists essentially of a cylinder-shaped cooler housing 10 with longitudinal cooling fins 10b and a vertical cylindrical bore which serves an an outer coil chamber wall 10a surrounding a likewise cylinder-shaped shell 19 of which the cylindrical outer wall defines an inner coil chamber wall 19e. The two coil chamber walls 10a and 19e are concentrically spaced from each other, forming an annular coil chamber R around the vertical center axis a—a of the cooling and filtering unit.

The space of the annular coil chamber R is occupied by a helical heat transfer coil in the form of a single length of finned heat transfer pipe 20, preferably of copper. A length portion of the heat transfer pipe 20 is shown in FIGS. 4 and 5 of the drawing, at an enlarged scale.

As can be seen in the lower part of FIG. 4, the heat transfer pipe 20 is a round pipe with a continuous helical fin 20b protruding radially from its wall. The helical fin 20b is an integral portion of the pipe wall. It is produced in a known rolling and shaping operation in which the pipe wall is extruded radially outwardly by shaping tools which operate in the manner of thread rolling tools. At the same time, the bore of the heat transfer pipe 20 is impressed with a number of shallow helical guide flutes 40.

As can be seen in the upper part of FIG. 4 and in the lower part of FIG. 5, the initially radially extending wall portion forming the helical fin 20b is further deformed in a localized right-angle bending operation about four distinct bending lines. FIG. 5 shows that the four bending lines are arranged in two pairs of diametrically oppositely located bending lines, in alignment with the four sides of a rectangle.

The bending operations on the helical fin 20b have the result of producing four fold segments 20c, 20c' and 20c" on the circumference of each fin helix. The up-ended fold segments are oriented parallel to the center line of the pipe, giving the finned heat transfer pipe 20 a substantially rectangular cross-sectional outline, as defined by the four bending lines. On the straight heat transfer pipe 20, all the fold segment thus coincide with four longitudinal surface planes.

The radial distances of the bending lines of the four fold segments from the center of the pipe 20 are not identical. They are preferably chosen in such a way that the apex of each fold segment is spaced a minimal distance from the radial wall of the next fin helix. In order to accommodate the bending of the heat transfer pipe 20 into the heat transfer coil of FIG. 3, it is therefore necessary to compensate for the resulting approach displacement of the fin walls on the inner diameter of the heat transfer coil and a corresponding separation displacement of the fin walls on the outer diameter of the heat transfer coil. This is done by correspondingly decreasing or increasing the height of the fold segments at their apexes beforehand.

This height compensation is accomplished by locating the bending lines for the inner fold segments 20c' further from the center of the pipe than the bending lines for the fold segments 20c'' on the upper and lower sides of the pipe 20 which retain their original axial spacing in the pipe coil. Conversely, the outer fold segments 20c are located closer to the center of the pipe than the folding lines of the upper and lower fold segments 20c'' (FIG. 4), for a greater height of the fold segments 20c. The result are substantially uniform apex clearances for the four sets of fold segments in the coiled state of the heat transfer pipe 20.

It is desirable to make the apex clearances of the four fold segments as small as possible. A certain amount of apex clearance is necessary, however, in order to compensate for certain discrepancies in the trueness and consistency of the outer diameter of the unbent fin portion 20b' resulting from the fin extrusion operation.

The outer diamter of the helical fin 20b is preferably coordinated with the axial lead of the helical fin 20b on the heat transfer pipe 20 in such a way that short unbent circumferential portions of the helical fin 20b remain between the four fold segments.

The proposed finned heat transfer pipe 20 with its upended fold segments makes it possible to accommodate a considerably larger number of pipe turns in a heat transfer coil of a given axial height or, alternatively, to arrange a given length of heat transfer pipe 20 in a heat transfer coil of reduced height.

The heat transfer coil is preferably fitted into the coil chamber R between the outer coil chamber wall 10a and the inner coil chamber wall 19e in such a way that the coil is preloaded in the radially outward sense against the outer coil chamber wall 10a.

By extruding the helical fin 20b on the heat transfer pipe 20 in a left-handed sense, as shown in FIG. 4, and by winding the heat transfer coil in a right-handed sense, as shown in FIG. 2, it is further possible to obtain an orientation of the outer fold segments 20c which is vertical, or very close to vertical, as the lead angle of the helically wound pipe 20 in the heat transfer coil compensates for the lead angle of the helical fin 20b. The result is a good heat transfer contact between the outer coil chamber wall 10a and the helical fin 20b of the heat transfer pipe 20 along the entire height of the outer fold segments 20c of pipe 20.

In the vertical sense, each coil turn rests with its lower fold segments 20c'' against the upper fold segments 20c'' of the coil turn below it, regardless of whether the fin helixes of the two turns are in vertical alignment or not. The upper and lower fold segments 20c'' thereby prevent the fins of vertically adjacent coil turns from becoming engaged between each other.

On the upper and lower extremities of the heat transfer coil, the heat transfer pipe 20 terminates in two connector assemblies 27 and 30, respectively. An upper pipe terminal 26, fitting between the walls 10a and 19e of the coil chamber R as a short curved extension of the heat transfer pipe 20, is soldered to the end of latter at the upper extremity of the heat transfer coil (FIG. 2).

The upper pipe terminal 26 has an angular bore with a threaded radial bore portion in alignment with a radial bore in the wall of the cooler housing 10. A hollow connector screw 27a extends through the radial bore of the cooler housing 10 into engagement with the threaded bore portion of the pipe terminal 26, clamping the latter against the outer coil chamber wall 10a. At the same time, the hollow connector screw 27a clamps a surrounding connector head 27b to a flat outer face of the cooler housing 10. A transverse bore 33 in the hollow connector screw 27a opens the bore of the connector screw to an interior cavity of the connector head 27b and to a hollow extension 28a of the latter. To the connector head extension 28a is attached the extremity of a water inlet hose 28 (FIG. 3).

The connector assembly 30 at the lower extremity of the heat transfer coil has the same structure as the connector assembly 27 at the upper extremity, consisting of a lower pipe terminal 29 engaged by a hollow connector screw 30a with a transverse bore 33, a connector head 30b with a hollow extension 31a, and a water outlet hose 31 attached to it. The lower pipe terminal 29 is soldered to the lower extremity of the heat transfer pipe 20 and has inner and outer curvatures matching the wall curvatures of the coil chamber R.

As can be seen in FIGS. 1 and 2, the cylinder-shaped cooler housing 10 has on its outer side a series of longitudinal cooling fins 10b. On its lower extremity, the housing 10 has a radially extending mounting flange 10e by means of which it is attachable to the vertical side wall 18 of a production machine, for example, the machine base of an injection molding machine.

The wall mounting flange 10e has an outer contour resembling a square placed on its edge (FIG. 1), with a protruding centering protrusion 10d in the form of a figure eight engaging a matching opening in the side wall 18 (FIG. 3). Two clamping screws 35, engaging threaded bores 34 near the lateral corners of the flange profile, clamp the cooler housing 10, and with it the entire cooling and filtering unit, to the side wall 18. In the two lobes of its figure-eight shape, the wall mounting flange 10e has arranged two radial channels, a fluid inlet channel 14 in the upper lobe, and a fluid outlet channel 15 in the lower lobe.

A connecting block 41 is removably attached to the transverse face of the centering protrusion 10d by means of a central clamping screw 37. Two dowel pins (not shown) of the connecting block 41 engage two centering bores 38 in the wall mounting flange 10e to provide an alignment between the connecting block 41 and the wall mounting flange 10e.

In alignment with the fluid inlet and outlet channels 14 and 15, the connecting block 41 has two angular bores, an upper angular bore ending in a vertically upwardly oriented threaded bore portion receiving the extremity of a fluid inlet line 16, and a lower angular bore ending in a similar vertically downwardly oriented threaded bore portion receiving the extremity of an fluid outlet line 17.

As can be seen in FIG. 3, the fluid inlet channel 14 communicates with the lower end portion of the coil chamber R which extends a short distance beyond the lower extremity of the heat transfer coil. The fluid outlet channel 15 leads to the interior space of a filter cartridge 21, through an outlet pipe 19b at the lower end of the plastic shell 19 which surrounds the filter cartridge 21. A filter support collar 10f in the center of the cooler housing 10 supports the shell 19 by engaging its lower end wall 19a, while separating the fluid inlet channel 14 from a vertical portion of the fluid outlet channel 15. An annular gasket 19c in the bore of the filter support collar 10f serves as a seal.

Inside the plastic shell 19 is arranged a tubular filter cartridge 21. A number of longitudinal spacer ribs 19f on the inner wall of the plastic shell 19 serve to position the filter cartridge 21 in concentric alignment with the plastic shell 19, thereby creating an equal number of longitudinal filter inlet channels K which communicate with the coil chamber R in the area of the flared upper edge 19d of the plastic shell 19. A number of radial spacer ribs 19g on the inside of the lower end wall 19a serve to position the filter cartridge 21 in the axial sense by engaging its bottom wall 21b.

The upper extremity of the filter cartridge 21 is closed off by means of a cartridge lid 21a. Retaining the filter cartridge 21 in the axial sense is a filter positioning rib 11b on the lower side of the housing cover 11 which engages the cartridge lid 21a. The bottom wall 21b of the filter cartridge 21 has a central opening through which extends an upper length portion of the outlet pipe 19b. In the opening of the bottom wall 21b is arranged an annular gasket 21c.

The housing cover 11 has a flange with a male thread 12 which cooperates with a matching female thread in the bore of the cooler housing 10. Four upstanding drive lugs 11a serve to screw the housing cover 11 in to the threaded bore of the cooler housing 10.

In the bottom wall of the cooler housing 10, diametrically opposite its wall mounting flange 10e, is arranged a throughbore with a threaded seat 39 which leads to the coil chamber R in the area where the latter adjoins the fluid inlet channel 14. The threaded seat 39 serves for the optional installation of a pressure monitoring means 45 which may take the form of a pressure gauge, pressure transducer, or pressure switch. The pressure monitoring means 45 is responsive to the flow resistance of the hydraulic fluid across the filter cartridge 21, thereby giving an indication of the degree to which the latter is laden with filter sludge.

In operation, hot used hydraulic drive fluid enters the cooling and filtering unit under pressure through the fluid inlet line 16 (FIG. 3) and the adjoining fluid inlet channel 14 at the bottom of the cooler housing 10. From there, the hot fluid flows upwardly through the annular coil chamber R where it is cooled through convective heat transfer from the fluid to a stream of water flowing inside the heat transfer pipe 20. Cold water enters the heat transfer coil at its upper end, via the connector assembly 27, exiting as hot water at its lower end, via the connector assembly 30.

Upon reaching the upper end of the coil chamber R, the cooled fluid reverses its flow direction to flow downwardly along the filter inlet channels K between the plastic shell 19 and the outer wall of the filter cartridge 21 and inwardly through the permeable wall of the filter cartridge 21. The cooled and filtered fluid then flows downwardly through the outlet pipe 19b of the plastic shell 19 into the fluid outlet channel 15 and the adjoining fluid outlet line 17 through which it leaves the device.

The shell 19 being of plastic material has the advantage of serving as an insulating barrier between the hot fluid in the coil chamber R and the cooled fluid in the filter inlet channels K. The space between the lower end wall 19a of the plastic shell 19 and the bottom wall 21b of the filter cartridge 21 serves as a sludge sump.

As the hot fluid is forced upwardly inside the coil chamber R, past the coiled heat transfer pipe 20, it comes into intimate contact with both the radial and the folded portions of the helical fin 20b of the pipe 20. This is due to the fact that the vertically oriented radial fin portions and outer fold segments 20c give the flow a vertical direction on the outer side of the coil chamber R, and the inclined inner fold segments 20c' give the flow a helical direction on its inner side, while the transversely oriented upper and lower fold segments 20c'' produce a turbulent cross flow between the inner and outer flow portions.

This turbulence and the smaller flow cross sections resulting from the radially narrower coil chamber R produce a more effective heat transfer action between the drive fluid and the cooling water. It follows that the novel cooling and filtering unit of the inventon is not only more compact than comparable prior art units, it also uses less cooling water, a fact which can be of importance in places where water is not abundant.

The filter cartridge 21 of the proposed cooling and filtering unit is readily removable from the unit. After the housing cover 11 is unscrewed, the cartridge can be withdrawn from the unit in a vertical movement along the longitudinal spacer ribs 19f, or it can be withdrawn together with the plastic shell 19 which is slidable vertically along the inner fold segments 20c' of the heat transfer pipe 20. In the case of a heavily sludge-laden filter cartridge, it is preferable to remove both parts together, as a sub-assembly, in order to avoid the escape of some of the sludge from the lower portion of the filter inlet channels K through the outlet pipe 19b and into the fluid outlet channel 15. With the shell 19 removed, the fluid inlet and outlet channels 14 and 15 communicate directly through the filter support collar 10f.

The heat transfer coil is removable in a similar way, following the unscrewing of the upper and lower connector assemblies 27 and 30 from pipe terminals 26 and 29. The configuration of the device of the invention thus greatly facilitates the removal of the primary components of the device for inspection and/or cleaning.

The device can also be operated without the filter cartridge 21, if only cooling of the hydraulic fluid is desired. In this case, the cooled hydraulic fluid flows directly from the top of the coil chamber R into the open inner cavity of the plastic shell 19, and from there through the outlet pipe 19b into the fluid outlet channel 15.

By arranging the filter cartridge downstream of the heat transfer coil, i.e. by filtering the hydraulic fluid after it has been cooled, the device of the invention offers the additional advantage of protecting the filter cartridge from the effects of sudden pressure changes in the hydraulic fluid.

Prior art cooling and filtering units for hydraulic fluid commonly have the filter cartridge arranged upstream of the cooling section of the unit, thereby exposing the delicate web of the filter wall to sometimes sharp flow changes under pressure waves caused by the switching action of the hydraulic valves, with the result that the longevity of the filter cartridge is considerably shortened. In the device of the invention, these pressure waves are largely attenuated by the heat transfer coil.

The proposed novel cooling and filtering unit for hydraulic fluid is a self-contained, compact device which is easy to install in the side wall of a production machine and easily accessible for servicing.

For situations where a great degree of cooling is required and only a space of limited height is available for the installation of the cooling and filtering unit, it is possible to arrange two or three heat transfer coils in a series-type connection, while maintainig the counter-flow for the cooling medium, whereby only one of the heat transfer coils has a filter cartridge associated with it.

It should be understood, of course, that the foregoing disclosure describes only a preferred embodiment of the invention and that it is intended to cover all changes and modifications of this example of the invention which fall within the scope of the appended claims.

I claim the following:

1. A cooling device for hydraulic working fluid for use with a hydraulically driven production machine, the fluid cooling device comprising in combination:
   a generally cylindrical cooler housing defining a longitudinal axis of the cooling device, the cooler housing forming an annular coil chamber, between an outer wall of the housing which defines the outer wall of the coil chamber and an inner wall of the housing which is concentrically spaced from the outer wall of the housing and defines the inner wall of the coil chamber;
   a housing cover attached to one axial end of the cooler housing, the annular coil chamber being axially accessible through removal of the housing cover;
   a fluid inlet channel and a fluid outlet channel formed by the cooler housing, the fluid inlet channel communicating with one axial extremity of the coil chamber, and the fluid outlet channel communicating with the other axial extremity of the coil chamber, for the flow of working fluid axially through the coil chamber;
   a heat transfer coil formed by a heat transfer pipe which is shaped into a series of axially contiguous helical pipe turns, the heat transfer coil being received inside the coil chamber in such a way that the two opposite ends of the heat trnasfer pipe are located in the vicinity of the two axial extremities of the coil chamber; and
   means for circulating through the heat transfer pipe a a coolant for the hydraulic working fluid, said circulating means including a connector assembly on each of the two ends of the heat transfer pipe; and wherein
   the heat transfer pipe is a metallic pipe of round cross section, carrying on its outer surface a radially oriented continuous helical fin of small axial lead, the helices of said fin defining between them a succession of flow passages, for the flow of the working fluid axially through the coil chamber; and
   the helical fin of the heat transfer pipe has at least one segment-shaped portion of each fin helix bent over at an angle of approximately 90°, along a straight bending line, so as to form a series of fold segments on the fin helices which are substantially aligned with each other in a surface plane which extends parallel to the center line of the heat transfer pipe, as seen in the straight condition of the heat transfer pipe, said fold segments contacting the outer wall of said annular coil chamber for heat exchange therewith.

2. A fluid cooling device as defined in claim 1, wherein
   the heat transfer pipe is a copper pipe; and
   the helical fin on the outer surface of the heat transfer pipe is an integral part of the copper pipe, being shaped from the wall of said pipe.

3. A fluid cooling device as defined in claim 1, wherein
   the helical fin of the heat transfer pipe has two bent-over fold segments on diametrically opposite sides of each fin helix, in alignment with two oppositely facing parallel surface planes, so that, in the heat transfer coil, the bent-over fold segments are located on the inner and outer radial sides of the heat transfer coil, forming quasi-cylindrical inner and outer surfaces on said coil.

4. A fluid cooling device as defined in claim 3, wherein
   the turns of the heat transfer pipe in the heat transfer coil and the helices of the helical fin on the heat transfer pipe run in the opposite helical sense, one in the right-handed sense, and the other one in the left-handed sense, so that the bending lines of the fold segments on the outer side of the heat transfer coil are oriented substantially parallel to the axis of the heat transfer coil.

5. A fluid cooling device as defined in claim 3, wherein
   the heat transfer coil is radially compressible within the limits of the elastic bendability of the heat transfer pipe; and
   the heat transfer coil cooperates with the outer wall of the coil chamber in such a way that the fold segments forming the outer surface of the heat transfer coil are in radially preloaded, heat-transferring contact with the outer wall of the annular coil chamber.

6. A fluid cooling device as defined in claim 3, wherein
   the distance from the center line of the heat transfer pipe to the bending lines of the fold segments on the outer side of the heat transfer coil is smaller than the distance from said center line to the bending lines of the fold segments on the inner side of the heat transfer coil, said distances differing by approximately the same amount by which the spacing of the bending lines of successive fin helices on the outer side of the heat transfer coil is greater than the spacing of the bending lines of successive fin helices on the inner side of the heat transfer coil.

7. A fluid cooling device as defined in claim 6, wherein
   said distances from the center line of the heat transfer pipe to the bending lines of the fold segments on the outer and inner sides of the heat transfer coil are such that a small clearance remains between the apexes of the bent-over fold segments and the bending lines of the nearest fin helices.

8. A fluid cooling device as defined in claim 3, wherein the helical fin of the heat transfer pipe has two additional bent-over fold segments on diametrically opposite sides of its fin helices, in alignment with two oppositely facing surface planes oriented at right angles to said first-mentioned surface planes, so that each fin helix has four bending lines coinciding with the four sides of a rectangle and, in the heat transfer coil, said additional fold segments are located on axially opposite sides of the pipe turns of the heat transfer coil.

9. A fluid cooling device as defined in claim 8, wherein
the distances from the center line of the heat transfer pipe to the bending lines of the four fold segments are such that four small unbent fin portions remain between the bent-over fold segments on the circumference of each fin helix.

10. A fluid cooling device as defined in claim 8, wherein
the turns of the heat transfer pipe in the heat transfer coil rest against each other in the axial sense, said fold segments on axially opposite sides of the heat transfer pipe contacting each other on successive pipe turns of the heat transfer coil.

11. A fluid cooling device as defined in claim 3, wherein
the heat transfer coil has a pipe terminal attached to each extremity of the heat transfer pipe, the two pipe terminals having elbow bores extending therethrough, one end portion of each elbow bore forming a continuation of the bore of the heat transfer tube, and another end portion of each elbow bore being a threaded bore portion which is open in the radially outward direction;
the outer wall of the cooler housing which forms the outer wall of the annular coil chamber has two radial throughbores in alignment with the threaded bore portions of the two pipe terminals; and
the two connector assemblies of the cooling fluid circulating means are attached to the pipe terminals by means of two threaded members engaging said threaded radial bore portions.

12. A fluid cooling device as defined in claim 11, wherein
the pipe terminals are elongated members having a transverse cross-sectional outline which is similar to the circumferential outline of the helical fin of the heat transfer pipe and which includes radially outwardly facing clamping faces surrounding the radial bore portions of the pipe terminals; and
each of said connector assemblies includes a hollow connector head forming an extremity of a cooling fluid line, the associated threaded member being a hollow connector screw reaching through the connector head into said threaded bore portion of a pipe terminal, so as to clamp said connector head and said pipe terminal against opposite sides of the housing wall of the cooler housing.

13. A fluid cooling device as defined in claim 11, wherein
the longitudinal axis of the cooler housing is oriented vertically, the housing cover being arranged at the upper end of the cooler housing;
the cooler housing has a pot-shaped main body with a substantially cylindrical outer housing wall forming the outer wall of the annular coil chamber and a bottom portion at the lower end of the housing,
the outer housing wall having radially oriented cooling fins on its outer side;
the cooler housing further includes a wall mounting flange extending radially outwardly from the bottom portion of the cooler housing and means for clamping the wall mounting flange to a vertical wall of a production machine; and
the wall mounting flange includes two interior fluid channels of which one is said fluid inlet channel and the other one is said fluid outlet channel.

14. A fluid cooling device as defined in claim 1, further comprising
a cylindrical filter cartridge arranged inside the cooler housing, on the downstream side of the coil chamber and in a concentric relationship therewith;
the filter cartridge has a tubular body with a closed-off axial extremity near the downstream side of the coil chamber and a bottom with an opening forming its other axial extremity, the bottom opening of the filter cartridge being part of the fluid outlet channel; and
the inner wall of the cooler housing which forms the inner wall of the annular coil chamber is part of a removable cylindrical shell surrounding the filter cartridge with an annular flow space between the filter cartridge and the shell, said flow space being open to the downstream end of the coil chamber, so that working fluid flows axially into said flow space and, from there, radially through the tubular body of the filter cartridge.

15. A fluid cooling device as defined in claim 14, wherein
the shell includes, on the inner side of its cylindrical wall, a plurality of longitudinally oriented spacer ribs of a radial height which is equal to the radial width of said annular flow space, said spacer ribs serving to position the filter cartridge in the radial sense;
the shell includes a bottom wall on that axial extremity which is located opposite the extremity at which said flow gap opens to the downstream end of the coil chamber, the shell enclosing the bottom of the filter cartridge with its bottom wall; and
the shell further includes, as part of its bottom wall, a central, axially extending outlet pipe forming part of the fluid outlet channel and extending sealingly through said bottom opening of the filter cartridge.

16. A fluid cooling device as defined in claim 15, wherein
the shell encloses the bottom wall of the filter cartridge with an axial gap, maintaining said gap by means of spacer ribs of a height which is equal to the width of said gap;
the shell is axially positioned in the cooler housing by a bottom of the cooler housing and by the housing cover bearing against said closed-off extremity of the filter cartridge which, in turn, bears against the spacer ribs on the bottom wall of the shell; and
the shell and the filter cartridge are removable from the cooler housing as a subassembly, following the removal of the housing cover.

17. A fluid cooling device as defined in claim 1, further comprising
means for measuring the pressure of the working fluid in the area of the fluid inlet channel.

* * * * *